E. F. WILLIAMS.
VALVE CONTROLLING MECHANISM FOR STEAM ENGINES.
APPLICATION FILED DEC. 20, 1912.
1,070,932.
Patented Aug. 19, 1913.
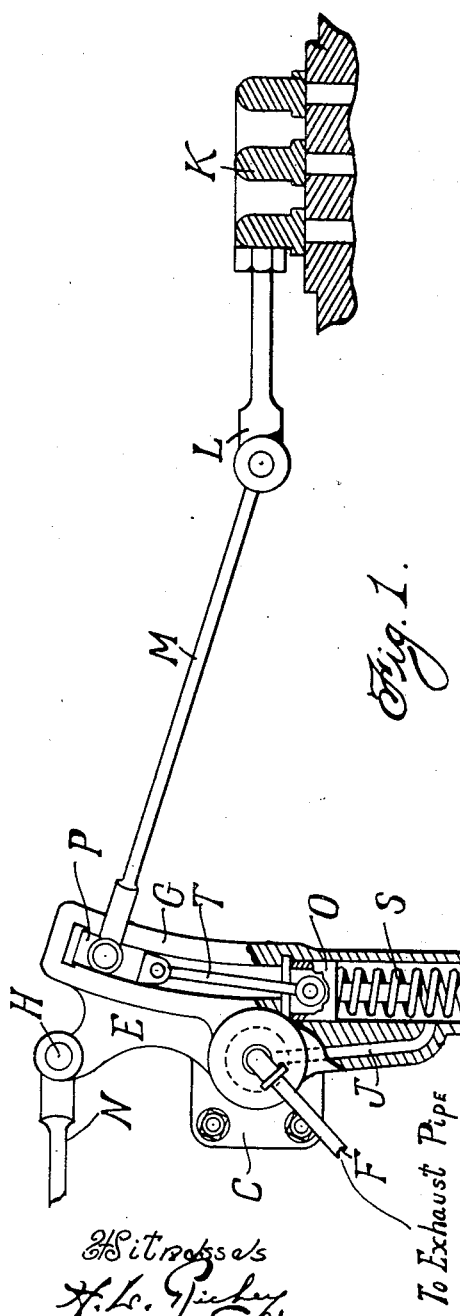
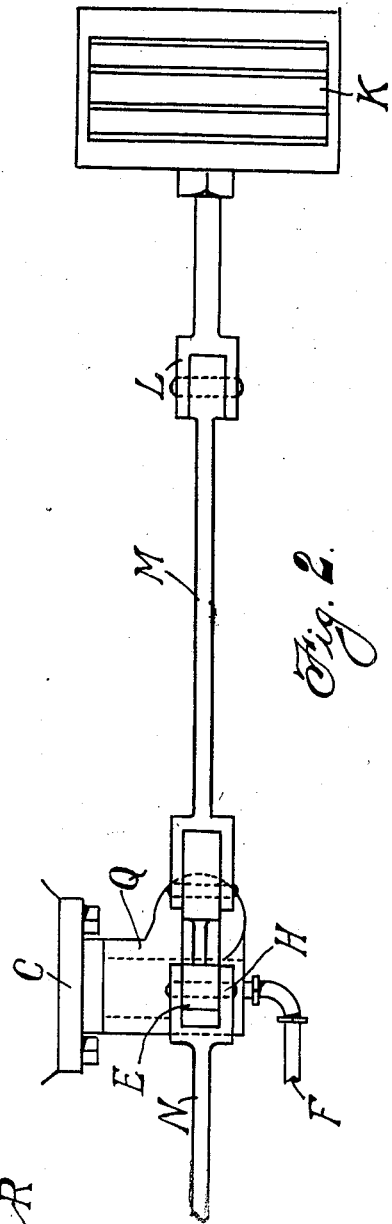
Inventor
Edwin F. Williams
By John A. Bommhardt.
Attorney

UNITED STATES PATENT OFFICE.

EDWIN F. WILLIAMS, OF ERIE, PENNSYLVANIA, ASSIGNOR TO THE SKINNER ENGINE COMPANY, OF ERIE, PENNSYLVANIA, A CORPORATION OF PENNSYLVANIA.

VALVE-CONTROLLING MECHANISM FOR STEAM-ENGINES.

1,070,932.      Specification of Letters Patent.      Patented Aug. 19, 1913.

Application filed December 20, 1912. Serial No. 737,886.

*To all whom it may concern:*

Be it known that I, EDWIN F. WILLIAMS, a citizen of the United States, residing at Erie, in the county of Erie and State of Pennsylvania, have invented certain new and useful Improvements in Valve-Controlling Mechanisms for Steam-Engines, of which the following is a specification.

This invention relates to valve controlling mechanisms for steam engines, and has for its object to have the operation of one or more of the valves of a steam engine under control of pressure in the exhaust pipe, so that it depends on the pressure within the pipe whether the valve is or is not in operation. For example: it may be desirable to operate the supplementary exhaust valve of a steam engine when the engine is running non-condensing and to throw it out or bring it to a standstill when there is a vacuum in the exhaust pipe. This device is intended to bring about that result automatically and it is particularly applicable to valve gears in which the valve is positively driven, either directly or indirectly.

An embodiment of the invention is illustrated in the accompanying drawings in which—

Figure 1 is an elevation of the gear, partly in section. Fig. 2 is a top plan.

In the drawings, G is a link with a cylinder E' at one end thereof. These are preferably cast in one piece with an extension E for carrying the rocker pin H, and with a central hub Q pivotally mounted on the bracket C which is secured to the side of the engine frame or other convenient support. The link and cylinder may swing freely on the axis of the hub Q, the eccentric rod N for operating the link being connected at the pin H. The link block P is connected by rod M to the valve rod L and valve K, for operating the valve as the link is rocked. The cylinder E' contains an air tight piston O which is connected by a rod T to the link block P, and said piston is pressed from below by a spring S the tension of which may be adjusted by the screw R. A passage J communicates at one end with the interior of the cylinder and the other end with a pipe F which is connected to the exhaust pipe (not shown) of the engine. The connection between the passage J and the pipe F is at the axis of oscillation of the link.

The operation is as follows: When the pressure of the spring S exceeds the vacuum in the exhaust pipe the link block P is moved to the end of the link, to give full throw to the valve, according to a governor control or otherwise. When the vacuum exceeds the spring pressure, the air pressure on the piston O forces said piston inwardly carrying with it the link block P, and if and when said link block is drawn in to the axial line no movement is communicated to the valve, and it will remain out of action until the vacuum falls sufficiently to permit the spring S to act and shift the link block P toward the end of the link again.

It will be seen that if for example the engine is runing non-condensing the valve K will be operated, but when a condenser is used and sufficient vacuum is produced in the exhaust the valve will cease to operate.

I claim.—

1. In a valve controlling mechanism for steam engines, the combination with a positively operated exhaust valve, of means governed by the vacuum in the exhaust pipe for controlling the operation of said valve.

2. In a valve controlling mechanism for steam engines, the combination with an exhaust valve, and a positive gear for operating the same, of means controlled by vacuum in the exhaust pipe for shifting said gear to inoperative position.

3. In a valve controlling mechanism for steam engines, the combination with a valve, of an oscillating link and shifting block thereon connected to the valve, a cylinder communicating with the exhaust pipe of the engine, a piston in the cylinder, connected to said block, and adapted to shift the same to inoperative position in the presence of vacuum in the cylinder, and a spring tending to shift the block to operative position.

4. In a valve controlling mechanism for steam engines, the combination with a valve, of an oscillating link and its shifting block therein connected to the valve to operate the same, a cylinder attached to the link to oscillate therewith and having a passage communicating with the exhaust pipe of the engine, a piston in said cylinder connected to the block and adapted to shift the same to inoperative position under vacuum in the cylinder, and opposing means tending to shift the block to operative position.

5. In a valve controlling mechanism for steam engines, the combination with a valve, of an oscillating link and shifting block therein connected to the valve, and means controlled by variations of pressure in the exhaust pipe of the engine for shifting said block in the link.

6. In a valve controlling mechanism for steam engines, the combination with a valve, of an oscillating link and shifting block therein connected to the valve, and means controlled by variations of pressure in the exhaust pipe of the engine for shifting said block in the link, said means including a spring operating on the block.

In testimony whereof, I do affix my signature in presence of two witnesses.

EDWIN F. WILLIAMS.

Witnesses:
 CHARLES G. BREVILLIER,
 M. LEVANT DAVIS.